US010036911B2

(12) United States Patent
Cho et al.

(10) Patent No.: US 10,036,911 B2
(45) Date of Patent: Jul. 31, 2018

(54) TILED DISPLAY DEVICE

(71) Applicant: Samsung Display Co., Ltd., Yongin (KR)

(72) Inventors: Dong Beom Cho, Asan-si (KR); Gyu Su Lee, Asan-si (KR); Yun Gun Lee, Asan-si (KR); Du Yeon Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 41 days.

(21) Appl. No.: 14/668,075

(22) Filed: Mar. 25, 2015

(65) Prior Publication Data
US 2016/0154262 A1 Jun. 2, 2016

(30) Foreign Application Priority Data
Nov. 27, 2014 (KR) .................. 10-2014-0167454

(51) Int. Cl.
*G02F 1/1333* (2006.01)
(52) U.S. Cl.
CPC .... *G02F 1/13336* (2013.01); *G02F 1/133308* (2013.01); *G02F 2001/13332* (2013.01); *G02F 2001/133317* (2013.01); *G02F 2001/133322* (2013.01)
(58) Field of Classification Search
CPC .................................. G02F 1/13336
See application file for complete search history.

(56) References Cited

U.S. PATENT DOCUMENTS

| | | | | |
|---|---|---|---|---|
| 5,867,236 A | * | 2/1999 | Babuka | G09F 9/3026 349/153 |
| 2003/0234343 A1 | * | 12/2003 | Cok | G02B 6/06 250/208.1 |
| 2013/0176352 A1 | * | 7/2013 | Watanabe | G09G 3/34 345/690 |
| 2014/0211129 A1 | * | 7/2014 | Bowser | G02F 1/13336 349/73 |

FOREIGN PATENT DOCUMENTS

| | | |
|---|---|---|
| KR | 10-2012-0004648 | 1/2012 |
| KR | 10-2012-0026229 | 3/2012 |

\* cited by examiner

*Primary Examiner* — Anne Hines
*Assistant Examiner* — Jacob R Stern
(74) *Attorney, Agent, or Firm* — H.C. Park & Associates, PLC

(57) ABSTRACT

A tiled display device includes a first display module including a first display panel configured to display an image, and first top chassis blocks disposed to surround the first display panel, and a second display module including a second display panel configured to display an image associated with the image displayed in the first display panel, and second top chassis blocks disposed to surround the second display panel. The first and second display modules are disposed in a tiled form, and each of the first top chassis blocks and the second top chassis blocks are spaced apart from each other by a first distance.

19 Claims, 11 Drawing Sheets

TILED DISPLAY DEVICE

CROSS-REFERENCE TO RELATED APPLICATION

This application claims priority from and the benefit of Korean Patent Application No. 10-2014-0167454, filed on Nov. 27, 2014, which is hereby incorporated by reference for all purposes as if fully set forth herein.

BACKGROUND

Field

Exemplary embodiments of the present invention relate to a display device, and more particularly to a tiled display device that may implement a large-sized screen by arranging display modules in a tiled form.

Discussion of the Background

Recently, demand for light, thin, short, and/or small flat panel display devices has increased due to development of portable electronic devices. Flat panel display devices may include a liquid crystal display, an electrophoretic display, an organic light emitting diode (OLED) display, an inorganic electroluminescent (EL) display, a field emission display (FED), a surface-conduction electron-emitter display (SED), a plasma display, a cathode ray tube (CRT) display, and the like.

As the range of applications of flat panel display devices expands, the flat panel display may be applied in a large-sized screen apparatus as well as an ordinary electronic apparatus. However, manufacturing the flat panel display device for a large-sized screen may increase the volume of the display device and decrease image quality.

A tiled display device including flat panel display modules connected in the form of tiles may be provided to implement a large-sized screen.

However, since the tiled display device may have a configuration of connected flat panel display modules, a non-display area in the flat panel display modules may form a boundary between adjacent display modules, which may clearly stand out in the large-sized screen.

A top chassis may be removed to prevent the boundary between adjacent display modules from standing out. However, although removing the top chassis may reduce the size of the non-display area, it may cause light to leak from the backlight side and deteriorate display quality. In addition, removing the top chassis may not support or protect to the display panel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a tiled display device that may protect a panel and reduce a non-display area by connecting flat panel display modules in a tiled form.

Additional aspects will be set forth in the detailed description which follows, and, in part, will be apparent from the disclosure, or may be learned by practice of the inventive concept.

According to an exemplary embodiment of present invention, a tiled display device includes a first display module including a first display panel configured to display an image, and first top chassis blocks disposed to surround the first display panel, and a second display module including a second display panel configured to display an image associated with the image displayed in the first display panel, and second top chassis blocks disposed to surround the second display panel, in which the first display module and the second display module are disposed in a tiled form, and each of the first top chassis blocks and the second top chassis blocks are spaced apart from each other by a first distance.

According to an exemplary embodiment of present invention, a tiled display device may include a first display module including a first display area configured to display an image, and a first non-display area surrounding the first display area, and a second display module disposed adjacent to the first display module, the second display module including a second display area configured to display an image, and a second non-display area surrounding the second display area. A portion of the first non-display area and a portion of the second non-display area overlap each other, and the first non-display area and the second non-display area are alternately arranged.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
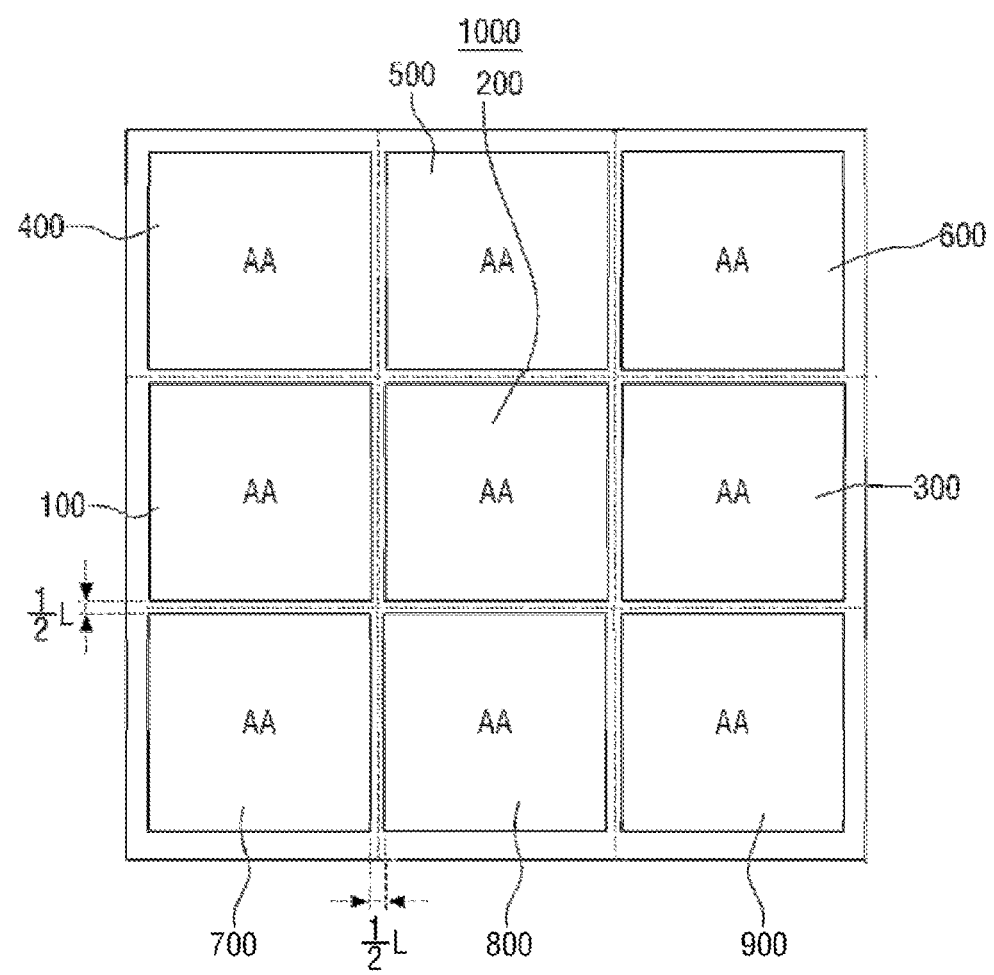
FIG. 1 is a plan view of a tiled display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A tiled display device according to an exemplary embodiment of the present invention may have a 3×3 tiled display device. The tiled device may also have n×m (n and m are natural numbers) tiled display device, regardless of the number of display modules to be joined.

FIG. 1 is a plan view of a tiled display device according to an exemplary embodiment of the present invention.

Referring to FIG. 1, a tiled display device 1000 according to an exemplary embodiment of the present invention may include display modules 100, 200, 300, 400, 500, 600, 700, 800, and 900 arranged in a tiled form. Each display module 100, 200, 300, 400, 500, 600, 700, 800, and 900 may include a display area where an image is displayed and a non-display area where an image is not displayed. The tiled display device 1000 may reduce a line width of the non-display area to about ½L as compared to a conventional display device, by overlapping areas of two adjacent display modules. A detailed description thereof will be made with reference to FIGS. 2 and 3.

Figure 2:
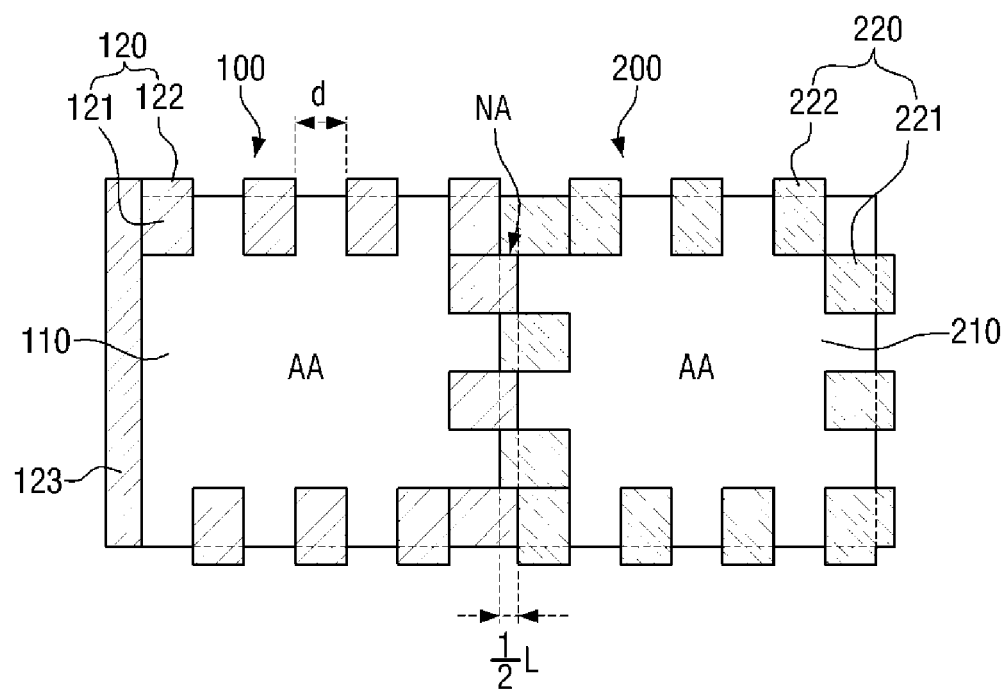
FIG. 2 is an enlarged plan view schematically showing area AA of FIG. 1.

FIG. 2 is an enlarged plan view schematically showing area AA of FIG. 1.

Referring to FIG. 2, the tiled display device 1000 according to the present exemplary embodiment may include a first display module 100 and a second display module 200. The display modules 100 and 200 may include top chassis blocks 120 and 220 arranged in a non-display area NA where an image is not displayed. The top chassis blocks 120 and 220 may be formed separately, and the top chassis blocks 120 and 220 may be spaced apart from each other by a first distance d to surround display panels 110 and 210. More particularly, the top chassis blocks 120 and 220 may be arranged in the non-display area NA of the display panels 110 and 210 respectively, having a "stepping stones" form (i.e., a first top chassis block extends to one side of the non-display area NA and an adjacent second top chassis block extends to the opposite side of the non-display area NA). The first distance d may correspond to the size of the top chassis blocks 120 and 220. A display module arranged at an edge portion of the tiled display device 1000 may not include the top chassis blocks 120 and 220 on a side that corresponds to the edge portion. For example, the first display module 100 may include a top chassis block 123 having a bar shape disposed on the side of the first display module 100 that does not contact sides of other display modules.

The top chassis blocks 120 and 220 may include first cover portions 121 and 221 partially covering upper surfaces of the display panels 110 and 210, and second cover portions 122 and 222 which are bent from the first cover portions 121 and 221 to partially surround the side surfaces of the display panels 110 and 210. The non-display area NA of the first display panel 110 spaced apart by the first distance d may be filled with the top chassis blocks 220 of the second display panel 210, which is arranged adjacent to the first display panel 110, thereby reducing a line width of the non-display area NA of the tiled display device 1000 to about ½L of a line width of a conventional display device. More particularly, the tiled display device 1000 according to the present exemplary embodiment may have top chassis blocks 120 of the first display module 100 and top chassis blocks 220 of the second display module 200 arranged alternately in the non-display area NA.

Figure 3:
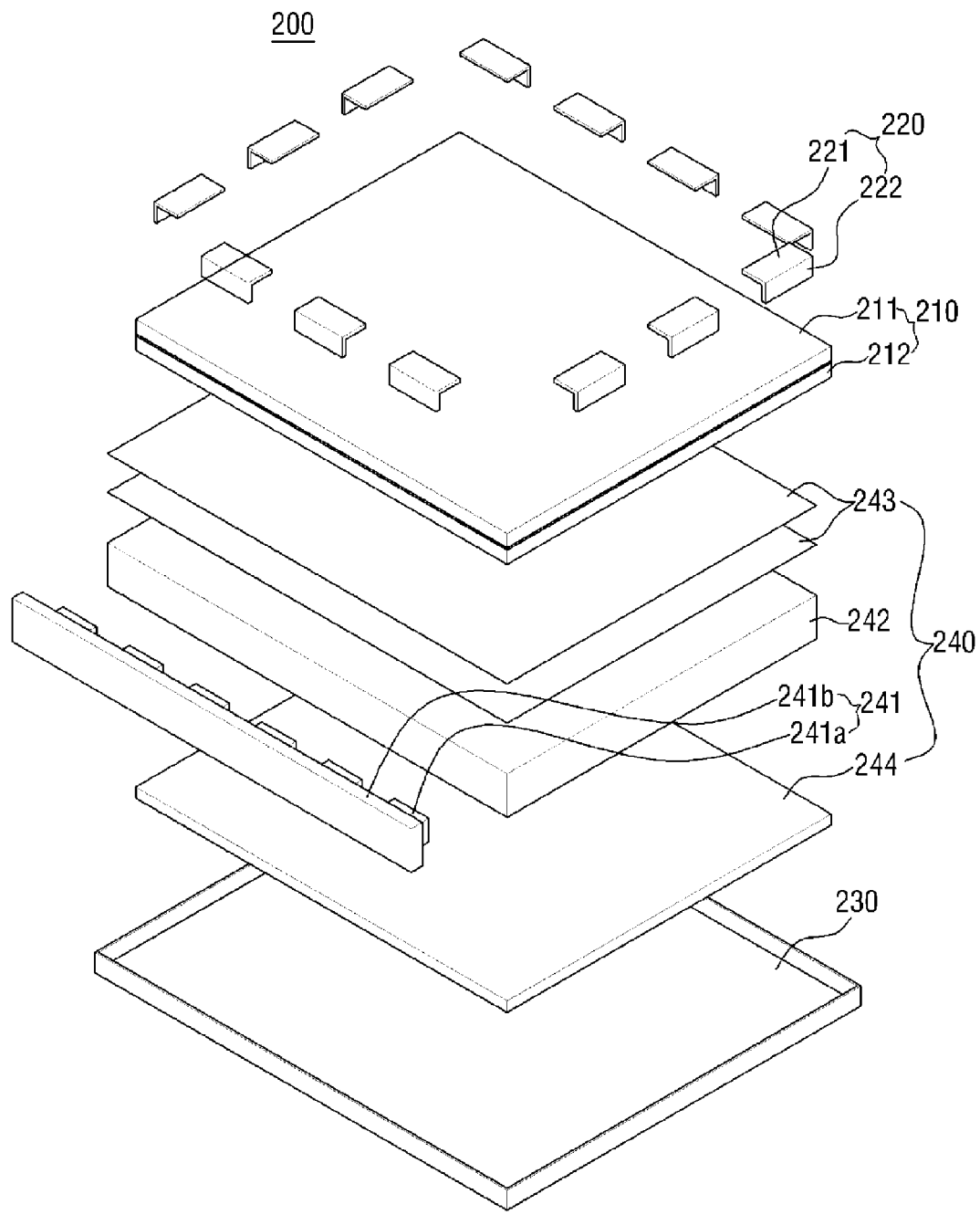
FIG. 3 is an exploded perspective view of a display module according to an exemplary embodiment of the present invention.
Figure 4:
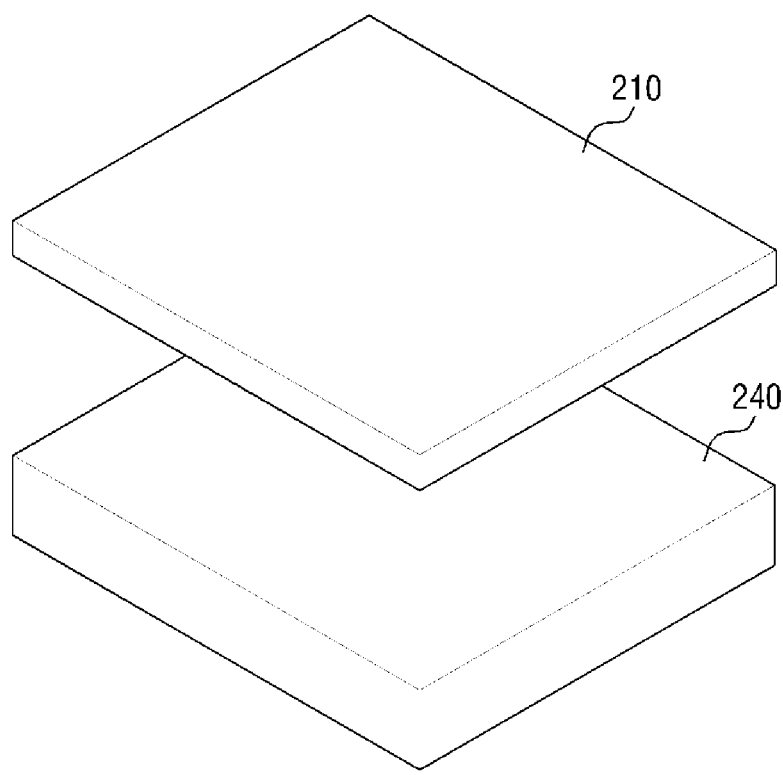
FIGS. 4 to 6 are perspective views schematically showing an assembling process of the display module of FIG. 3.
Figure 5:
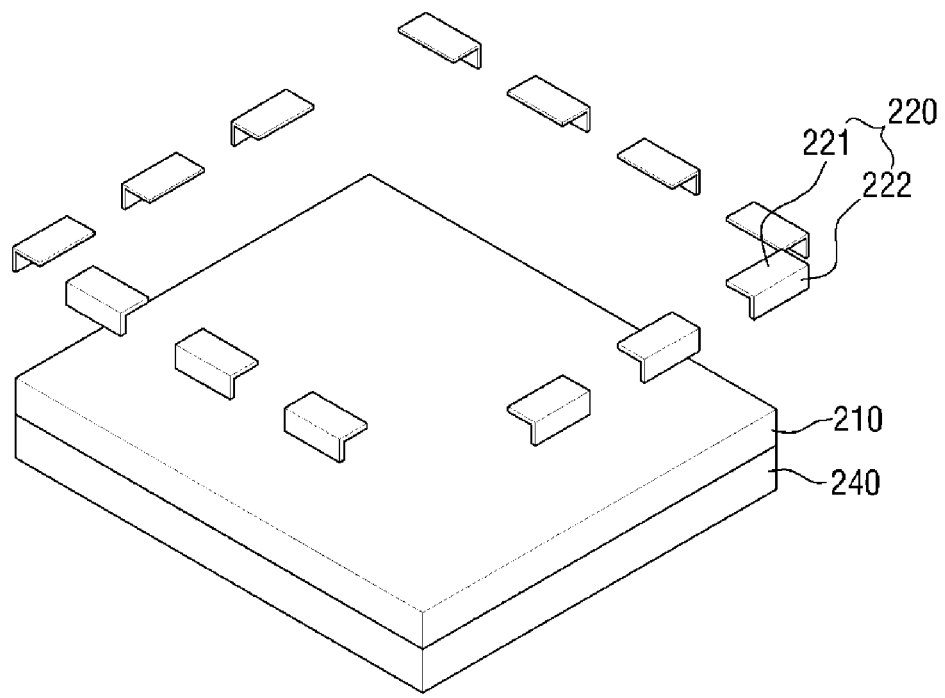
Figure 6:
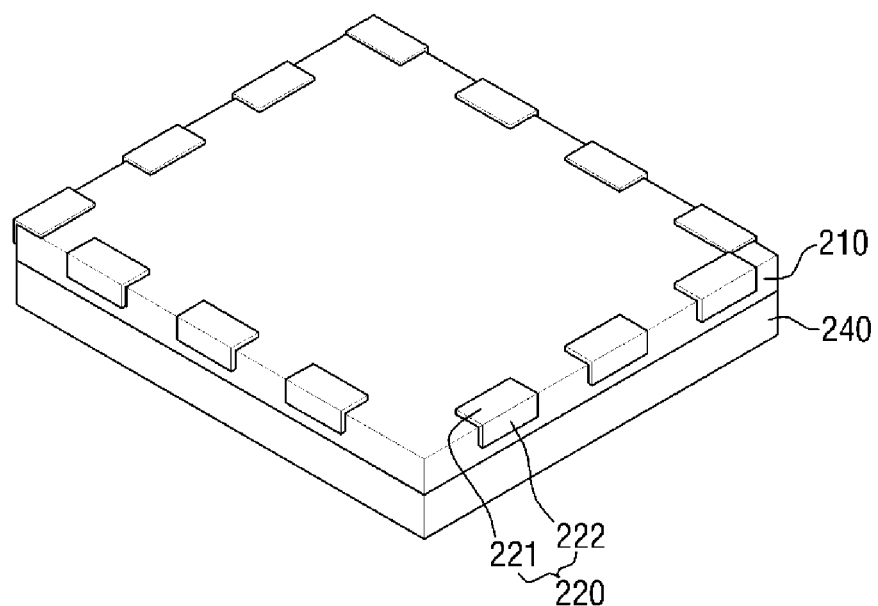

FIG. 3 is an exploded perspective view of a display module according to an exemplary embodiment of the present invention. FIGS. 4 to 6 are perspective views schematically showing an assembling process of the display module of FIG. 3.

Referring to FIG. 3, the second display module 200 according to the present exemplary embodiment may include a display panel 210, a top chassis block 220, a bottom chassis 230, and a backlight assembly 240.

The display panel 210 may be a panel displaying an image, and may be one of a liquid crystal display (LCD) panel, an electrophoretic display panel, an organic light emitting diode (OLED) panel, a light emitting diode (LED) panel, an inorganic electroluminescent (EL) panel, a field emission display (FED) panel, a surface-conduction electron-emitter display (SED) panel, a plasma display panel (PDP), and a cathode ray tube (CRT) display panel. Hereinafter, exemplary embodiments of the present invention will be described with respect to a display panel having a liquid crystal display device, and the display panel 210 will be explained as a LCD panel, for ease of description.

The display panel 210 may include a first substrate 211, a second substrate 212 facing the first substrate 211, and a liquid crystal layer (not shown) interposed between the first substrate 211 and the second substrate 212.

The first substrate 211 and the second substrate 212 may have a rectangular parallelepiped shape. The first substrate 211 and the second substrate 212 may also have other shapes according to the shape of the display panel 210.

The liquid crystal layer may be interposed between the first substrate 211 and the second substrate 212. Further, a sealing member such as a sealant may be disposed along edge portions of the first substrate 211 and the second substrate 212 to adjoin and seal the first substrate 211 and the second substrate 212.

Although not shown in FIG. 3, the display panel 210 may include a drive unit and a flexible printed circuit board, which may be attached to the first substrate 211 or the second substrate 212. The drive unit may apply various signals such as a drive signal required to display an image in the display area. The flexible printed circuit board may output various signals to the drive unit.

Top chassis blocks 220 may be arranged to surround the upper and side surfaces of the display panel 210 in order to protect the display panel 210. Each of the top chassis blocks 220 may include a first cover portion 221 partially covering the upper surface of the display panel 210, and a second cover portion 222 that is bent from the first cover portion 221 to partially cover the side surfaces of the display panel 210. According to an exemplary embodiment of the present invention, the second cover portion 222 may be formed to partially surround the side surfaces of the display panel 210 and the backlight assembly 240. The top chassis blocks 220 may be arranged to be separated from each other by the first distance d. The top chassis blocks 220 may be made of a conductive material such as metal, and attached to a portion of the upper and side surfaces of the display panel 210 by glue or adhesive material. The tiled display device 1000 that includes the top chassis blocks 220 according to the present exemplary embodiment may have a reduced line width of the non-display area NA to about ½L of a line width of a conventional display device.

The bottom chassis 230 may contain the backlight assembly 240. The bottom chassis 230 may be made of a conductive material such as metal, and may be engaged with the top chassis blocks 220 to surround the backlight assembly 240. The bottom chassis 230 and the backlight assembly 240 may be separate components, or alternatively, the bottom chassis 230 may be one of components constituting the backlight assembly 240.

The backlight assembly 240 may be disposed below the display panel 210 to provide light such that an image may be displayed on the display panel 210. The backlight assembly 240 may include a light source unit 241, a light guide plate 242, an optical sheet 243 and a reflection plate 244.

The light source unit 241 may generate light and irradiate the generated light to the light guide plate 242. Referring to FIG. 3, the light source unit 241 may be arranged to correspond to one long side of the light guide plate 242. Alternatively, the light source unit 241 may be arranged to correspond to one short side of the light guide plate 242. The light source unit 241 may include light sources 241a and a circuit board 241b.

The light guide plate 242 may be disposed on the side of the light source unit 241. More particularly, the light guide plate 242 may be located on substantially the same plane as the light source unit 241. The light guide plate 242 may guide light irradiated from the light source unit 241 and transmit the light to the display panel 210. The light guide plate 242 may be formed of a transparent material such as polymethyl-methacrylate (PMMA) or any transparent materials that may guide light. Further, the light guide plate 242 may be made of a rigid material or a flexible material.

The optical sheet 243 may be disposed on the light guide plate 242. The optical sheet 243 may include optical sheets, and the optical sheets 243 may be stacked to overlap each other and complement each other. According to an exemplary embodiment of the present invention, the optical sheets 243 may include at least one prism sheet or a diffusion sheet.

The reflection plate 244 may be disposed below the light guide plate 242. The reflection plate 244 may change a path of light emitted from the light source unit 241 and traveling to the lower side of the light guide plate 242. The reflection plate 244 may be formed of a reflective material such as metal.

Referring to FIG. 4, the display module 200 according to an exemplary embodiment of the present invention may be formed by adjoining the display panel 210 and the backlight assembly 240 to each other. Then, as shown in FIG. 5, top chassis blocks 220 may be arranged to have intervals of the first distance d on the display panel 210 and the adjoined backlight assembly 240. Then, as shown in FIG. 6, the display module 200 according to the present exemplary may formed by fixing the top chassis blocks 220 to the display panel 210 and the adjoined backlight assembly 240. The backlight assembly 240 described with reference to FIGS. 4 to 6 may include the bottom chassis 230.

Figure 7:
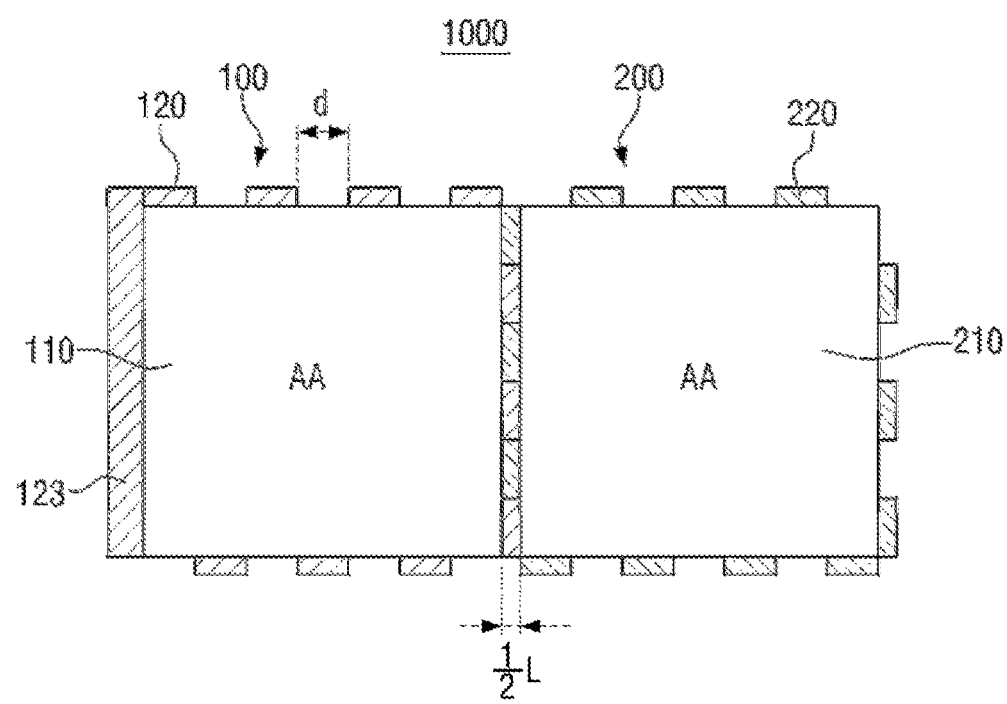
FIG. 7 is a plan view schematically showing a part of a tiled display device according to an exemplary embodiment of the present invention.

FIG. 7 is a plan view schematically showing a part of a tiled display device according to an exemplary embodiment of the present invention.

Figure 8:
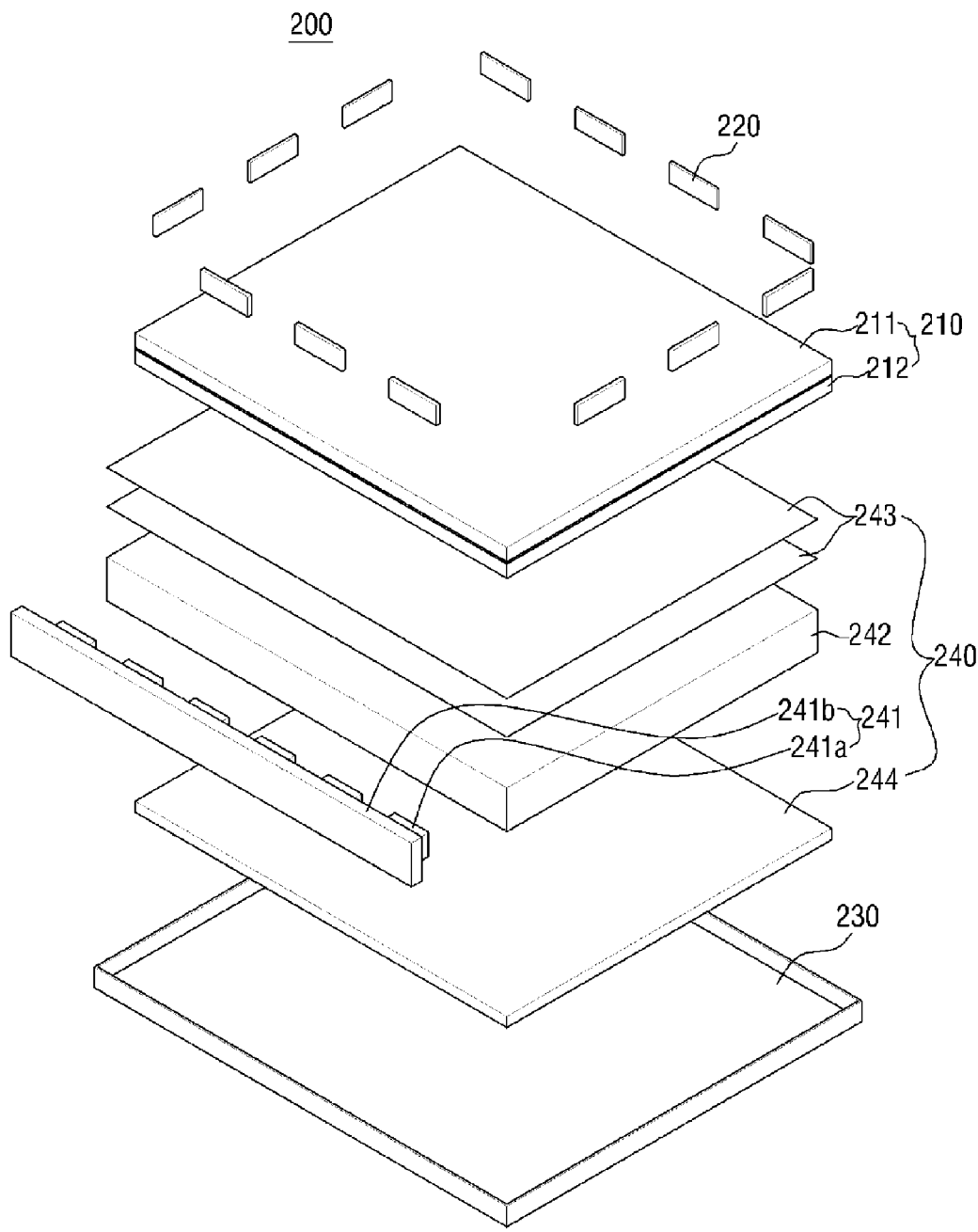
FIG. 8 is an exploded perspective view of a display module according to an exemplary embodiment of the present invention.

Referring to FIG. 7, a tiled display device 1000 according to the present exemplary embodiment may include a first display module 100 and a second display module 200. Referring to FIG. 7 and FIG. 8, the second display module 200 may include a display panel 210, a bottom chassis 230 containing a backlight assembly 240, and top chassis blocks 220 that may support and protect the backlight assembly 240. A display module arranged at an edge portion of the tiled display device 1000 may not include the top chassis blocks 120 and 220 on a side that corresponds to the edge portion. For example, the first display module 100 may include a top chassis block 123 having a bar shape disposed on the side that does not contact sides of other display module.

Top chassis blocks 120 and 220 may be arranged in the non-display area NA of the first display module 100 and the second display module 200. The top chassis blocks 120 and 220 of the tiled display device 1000 according to the present exemplary embodiment may be arranged only on the side surfaces of the display panels 110 and 210 and/or the backlight assemblies 140 and 240. The top chassis blocks 120 and 220 may be arranged in a form of stepping stones, such as described above, to be separated from each other by a first distance d. The non-display area NA of the first display panel 110 spaced apart by the first distance d may be filled with the top chassis blocks 220 of the second display panel 210 arranged adjacent to the first display panel 110, thereby reducing a line width of the non-display area NA of the tiled display device 1000 to about ½L of a line width of a conventional display device. More particularly, the tiled display device 1000 according to the present exemplary embodiment may have the top chassis blocks 120 of the first display module 100 and the top chassis blocks 220 of the second display module 200 arranged alternately in the non-display area NA.

FIG. 8 is an exploded perspective view of a display module according to an exemplary embodiment of the present invention. FIGS. 9 to 12 are perspective views schematically showing an assembling process of the display module of FIG. 8.

The display module of FIG. 8 has the substantially similar elements as the display module in FIG. 3, and description of the substantially similar elements and operations illustrated with respect to FIG. 3 will be omitted.

Referring to FIG. 8, the top chassis blocks 220 of the display module 200 according to the present exemplary embodiment may be formed in a small rectangular parallelepiped shape. The top chassis blocks 220 formed in a rectangular parallelepiped shape may partially cover only the side surfaces of the display panel 210. More particularly, the display module 200 may be a borderless member. Since the top chassis blocks 220 may partially cover the side surfaces of the display panel 210, or the display panel 210 and the backlight assembly 240, a boundary between a display screen and the edge of the display module 200 may be further reduced, while fixing the display panel 210, or the display panel 210 and the backlight assembly 240, thereby improving the quality a front surface of the display device.

Figure 9:
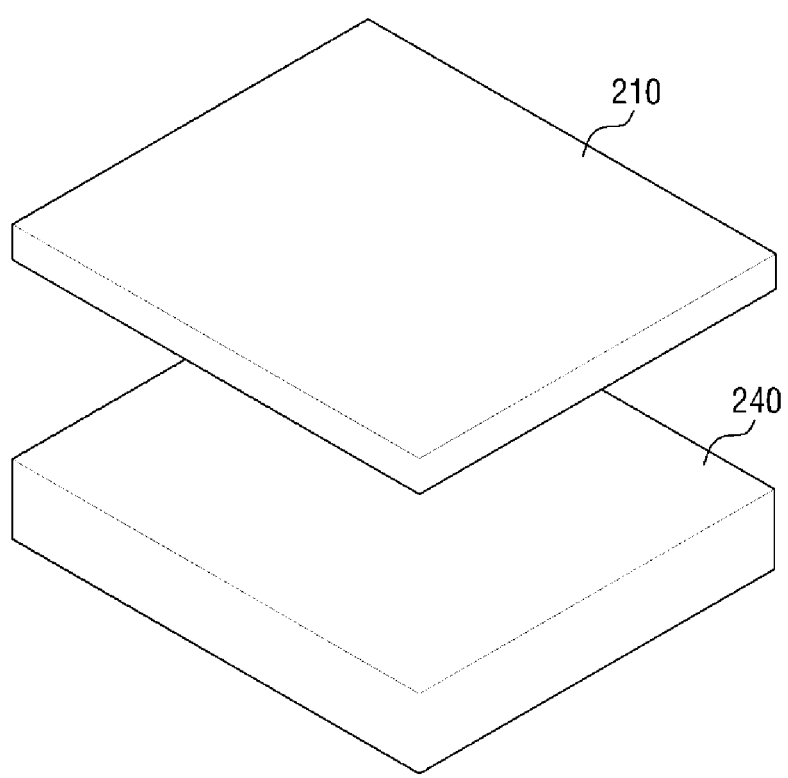
FIGS. 9 to 12 are perspective views schematically showing an assembling process of the display module of FIG. 8.
Figure 10:
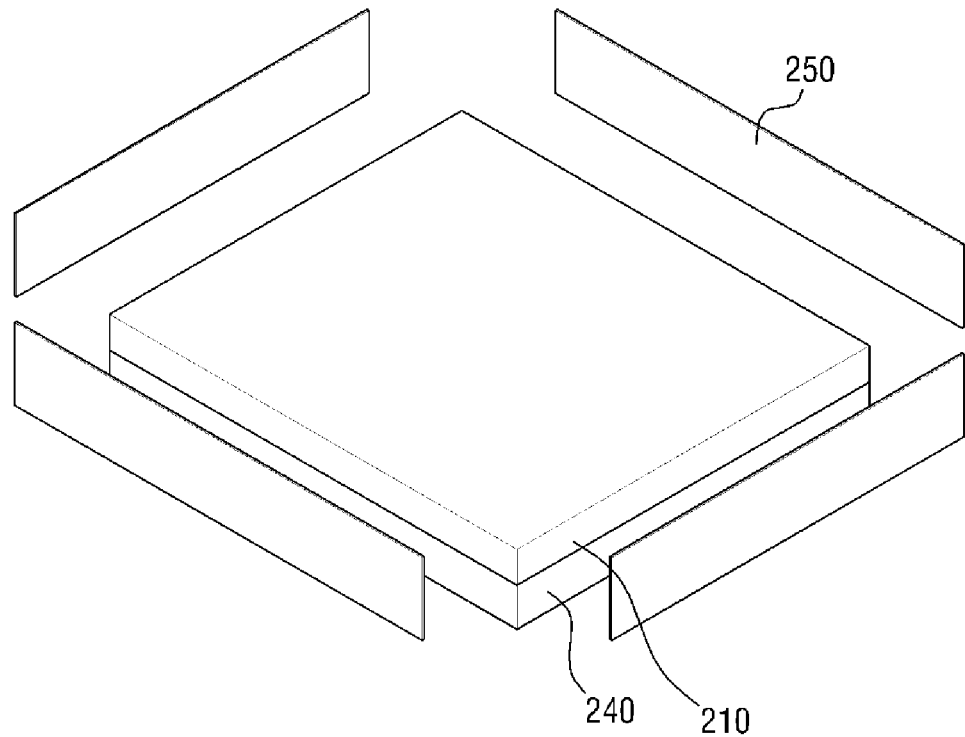
Figure 11:
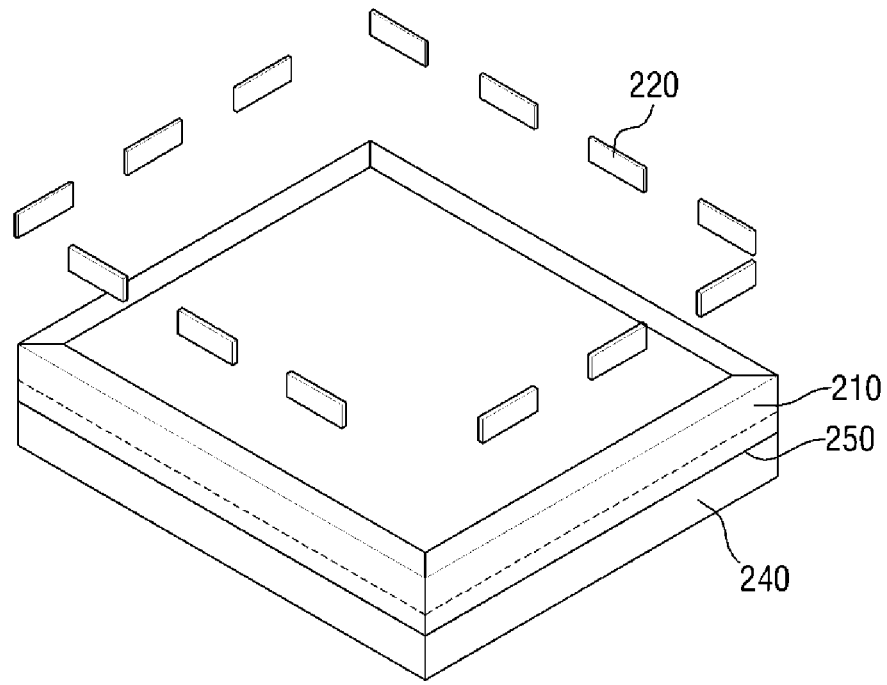
Figure 12:
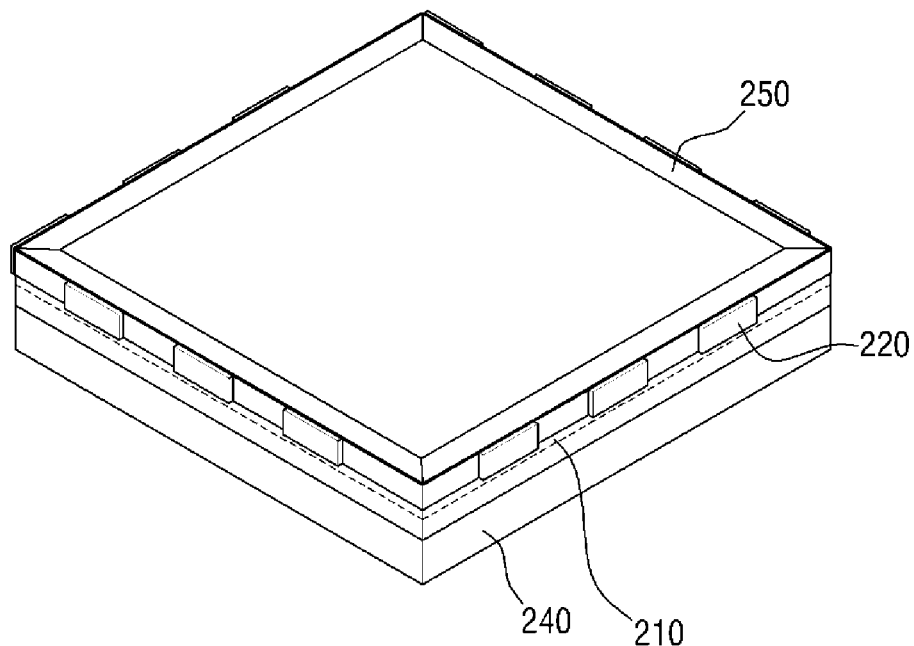

In a coupling process, as shown in FIG. 9, the display panel 210 and the backlight assembly 240 may be adjoined to each other. Then, as shown in FIG. 10, in order to improve the fixation of the display panel 210 and the backlight assembly 240, a transparent film 250 may be attached to an edge region of the upper surface of the display panel 210 and the side surfaces of the display panel 210, or the display panel 210 and the backlight assembly 240, as the top chassis blocks 220 of the tiled display device 1000 may be borderless members. The transparent film 250 may alternatively be attached to the entire upper surface and the side surfaces of the display panel 210. After the transparent film 250 is attached to the display panel 210 and the backlight assembly 240, as shown in FIG. 11, the top chassis blocks 220 may be partially disposed on the side surfaces of the display panel 210. Then, as shown in FIG. 12, the display module according to the present exemplary embodiment may be completed by partially attaching the top chassis blocks 220 along the side surfaces of the display panel 210 by using glue or adhesive material, so that the top chassis blocks 220 may be separated from each other by a first distance d.

Figure 13:
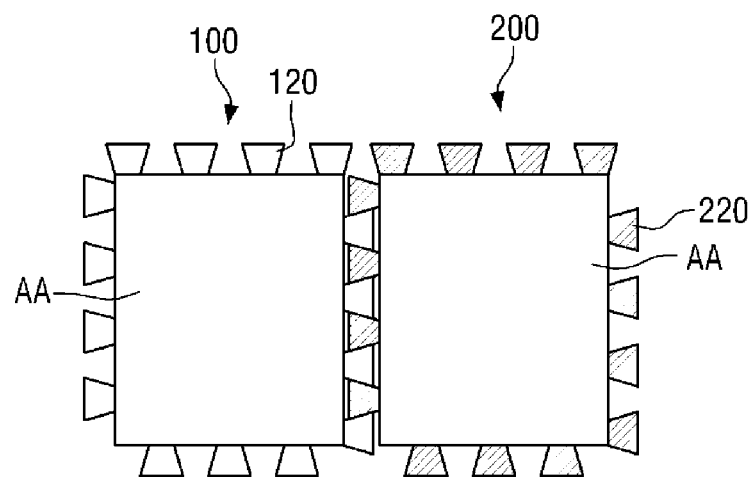
FIG. 13 is a plan view showing a part of a tiled display device according to an exemplary embodiment of the present invention.
Figure 14:
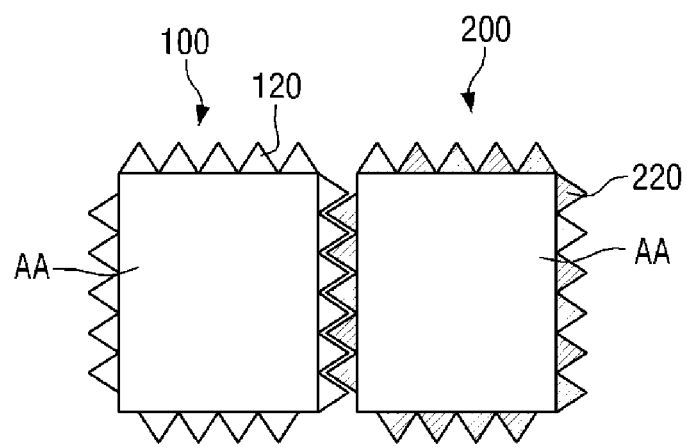
FIG. 14 is a plan view showing a part of a tiled display device according to an exemplary embodiment of the present invention.

FIG. 13 is a plan view showing a part of a tiled display device according to an exemplary embodiment of the present invention. FIG. 14 is a plan view showing a part of a tiled display device according to an exemplary embodiment of the present invention.

Referring to FIG. 13, the top chassis blocks 120 and 220 according to an exemplary embodiment of the present invention may have a trapezoidal shape, and may be arranged in non-display areas of the display modules 100 and 200 to be separated from each other by a first distance. The top chassis blocks 120 and 220 having a trapezoidal shape may be borderless members.

Referring to FIG. 14, the top chassis blocks 120 and 220 according to an exemplary embodiment of the present invention may have a triangular shape. The top chassis blocks 120 and 220 having a triangular shape may be borderless members.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A tiled display device, comprising:
    a first display module comprising:
        a first display panel configured to display an image; and
        first top chassis blocks configured to not display an image and disposed to surround each side of the first display panel; and
    a second display module comprising:
        a second display panel configured to display an image associated with the image displayed in the first display panel; and
        second top chassis blocks configured to not display an image and disposed to surround each side of the second display panel,
    wherein:
        the first and second display modules are disposed in a tiled form;
        each of the first top chassis blocks and the second top chassis blocks are spaced apart from each other by a first distance; and
        the first top chassis blocks and the second top chassis blocks are alternately disposed on an area where the first display module is adjacent to the second display module.

2. The tiled display device of claim 1, wherein each of a first top chassis block of the first top chassis blocks and a second top chassis block of the second top chassis blocks comprises:
    a first cover portion partially covering upper surfaces of the first display panel and the second display panel, respectively; and
    a second cover portion bent from the first cover portion to partially cover side surfaces of the first display panel and the second display panel, respectively.

3. The tiled display device of claim 1, wherein each of the first top chassis blocks and the second top chassis blocks partially cover side surfaces of the first display panel and the second display panel, respectively.

4. The tiled display device of claim 3, wherein each of the first top chassis blocks and the second top chassis blocks comprises one of a square, triangular, and trapezoidal shape.

5. The tiled display device of claim 1, wherein the first distance corresponds to a width of a first top chassis block of the first top chassis blocks or a second top chassis block of the second top chassis blocks.

6. The tiled display device of claim 1, wherein each of the first and second display modules comprises a backlight assembly configured to supply light to the first and second display modules, respectively.

7. The tiled display device of claim 1, wherein the first display module further comprises a third top chassis block having a bar shape disposed on a side of the first display panel that is not adjacent to the second display panel.

8. The tiled display device of claim 1, wherein the first and second top chassis blocks comprise a metal.

9. A tiled display device, comprising:
a first display module comprising:
a first display area configured to display an image; and
first top chassis blocks spaced apart from each other, configured to not display an image, and surrounding the first display area; and
a second display module disposed adjacent to the first display module, the second display module comprising:
a second display area configured to display an image; and
second top chassis blocks spaced apart from each other, configured to not display an image, and surrounding the second display area, wherein:
a portion of the first top chassis blocks and a portion of the second top chassis blocks overlap each other in a plan view; and
overlapping portions of the first top chassis blocks and the second top chassis blocks are alternately arranged.

10. The tiled display device of claim 9, wherein each of the first display area and the second display area comprises a display panel and a backlight assembly.

11. The tiled display device of claim 9, wherein the first top chassis blocks are spaced apart from each other by a first distance.

12. The tiled display device of claim 9, wherein the second top chassis blocks are spaced apart from each other by a first distance.

13. The tiled display device of claim 9, wherein the first top chassis blocks and the second top chassis blocks are alternately arranged.

14. The tiled display device of claim 9, wherein each of a first top chassis block of the first top chassis blocks and a second top chassis block of the second top chassis blocks comprises:
a first cover portion partially covering upper surfaces of the first display area and the second display area, respectively; and
a second cover portion bent from the first cover portion to partially cover side surfaces of the first display area and the second display area, respectively.

15. The tiled display device of claim 9, wherein each of the first top chassis blocks and the second top chassis blocks is disposed to partially surround side surfaces of the first display area and the second display area, respectively.

16. The tiled display device of claim 15, wherein each of the second top chassis blocks comprises one of a square, triangular, and trapezoidal shape.

17. The tiled display device of claim 13, wherein the first top chassis blocks and the second top chassis blocks are alternately arranged to correspond each other.

18. The tiled display device of claim 9, wherein the first top chassis blocks and the second top chassis blocks comprise a metal.

19. The tiled display device of claim 1, wherein the first top chassis blocks and the second top chassis blocks comprise a metal.

* * * * *